Patented Nov. 23, 1937

2,099,915

UNITED STATES PATENT OFFICE 2,099,915

HOSE COUPLING

Albert J. Weatherhead, Jr., Cleveland, Ohio, assignor to The Weatherhead Company, Cleveland, Ohio, a corporation of Ohio Original application December 18, 1931, Serial No. 581,893, now Patent No. 2,000,680, dated May 7, 1935. Divided and this application April 24, 1935, Serial No. 17,937

1 Claim. (Cl. 285—84)

This invention relates to a hose coupling and more particularly to a metallic coupling joined to a non-metallic hose according to the method disclosed in my copending application Serial No. 581,893, filed December 18, 1931 now matured into Patent No. 2,000,680, May 7, 1935 of which this application is a division.

In hydraulic brake systems or other systems which necessitate the transmission of fluid or gases under considerable pressure through flexible conduits it is important that the flexible conduits be securely joined to the rigid parts of the system and that the coupling device to effect this be shaped to prevent wear or abrasion of the flexible conduit upon relative swinging or bending movements of the conduit with respect to the coupling.

It is among the objects of this invention to provide a metallic coupling wherein a sleeve is proportioned to encompass the end of a non-metallic hose and is formed with an internal protuberant rib to press the hose against a nipple and against a radial wall of the coupling integral with the sleeve.

A further object of the invention is to provide a coupling having an integral sleeve with a protuberant rib to grip a hose and a "bell-mouth" or flared open end formed simultaneously with the rib. A further object of the invention is to provide a joint formed by a metallic coupling and a non-metallic hose wherein the hose is forced longitudinally into abutment with a radial wall of the coupling by a protuberant hose gripping rib on the coupling. A further object of the invention is to provide a metallic hose coupling having a nipple arranged to be encompassed by a hose, a radial wall to engage the end of the hose and a sleeve fixed with respect to the radial wall arranged to encompass the hose. A further object of the invention is to provide a strong mechanical joint which is leak proof under high pressure and which may be economically formed.

Other objects relating to details of construction and economies of manufacture will appear hereinafter.

Figure 1:
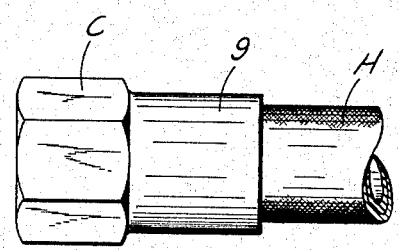
Figure 2:
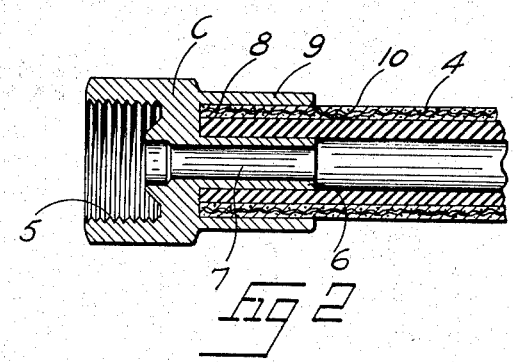
Figure 3:
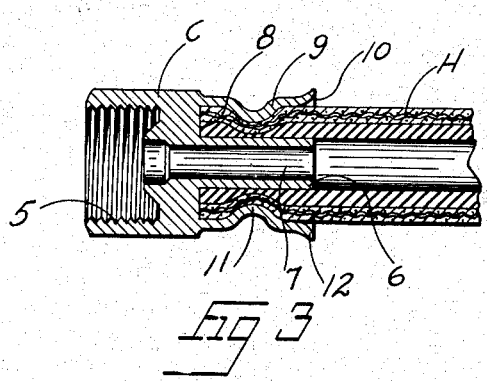
Figure 4:
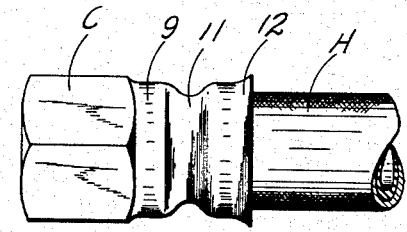

In the accompanying drawing which illustrates a preferred embodiment of the invention, Figure 1 is an elevation of the coupling arranged on the hose prior to the rib forming operation; Figure 2 is a longitudinal sectional view of the assembly of Figure 1; Figure 3 is a sectional view similar to Figure 1 subsequent to the rib forming operation; and Figure 4 is an elevation of the hose and coupling permanently connected to each other.

Referring to the drawing the coupling is identified generally as C and comprises a body portion interiorly threaded at one end as at 5 and formed with a polygonal exterior to facilitate connecting the coupling to other instrumentalities. The hose engaging end of the coupling preferably comprises a nipple portion 6 internally bored longitudinally as at 7, a radial wall at 8 and a sleeve 9 proportioned to encompass the hose. The hose H may be the conventional rubber and fabric construction and may be readily positioned in the annular space between the nipple and sleeve with the end surface of the hose against the radial wall 8 as shown in Figure 2. The sleeve 9 may be rounded or chamfered at its outer end as at 10 to reduce the tendency of the sleeve to abrade or wear away the fabric of the hose at this point.

According to the method of my copending application, the sleeve 9 of the coupling C, assembled with the hose as shown in Figures 1 and 2 is deformed inwardly preferably by a rolling or spinning operation which exerts radial pressure on the sleeve 9 to form the inwardly extending rib 11 as illustrated in Figure 3. Simultaneously with the formation of the rib 11 and due to the rolling or spinning operation, a flare or bell mouth 12 is formed on the sleeve. The operation of forming the rib also causes the material of the hose intermediate the rib 11 and the radial wall 8 to be highly compressed and in addition to forming a secure bond between the hose and nipple and sleeve, the compression of the hose causes the material of the hose to be compressed against the radial wall 8, thus sealing the cut end of the hose and preventing any fluid which might reach the end of the hose from going farther or from working back through the fabric of the hose which is normally exposed at the cut end.

The flare 12 at the end of the sleeve forms a rounded support for the hose when the hose is curved with respect to the coupling in the manner conventional in hydraulic brake assemblies. The wear of the hose against the coupling due to oscillation of the hose with respect to the coupling is reduced to a minimum by reason of the broad support afforded by the flared chamfered end. As will be understood from the method of connecting the hose to the coupling described in the above identified copending application, the position of the rib 11 with respect to the open end of the sleeve will determine the characteristics of the bell mouth. For instance, if the rib 11 were formed more nearly adjacent the open end of the sleeve than as illustrated, that part of the rib adjacent the end would merge into or become a part of the bell mouth.

The straight side walls of the nipple and sleeve of the coupling facilitate the assembly of the coupling with the hose prior to the rolling or spinning of the rib, and the hose may be placed with the cut end in abutment with the radial wall in the first assembling step. The parts are held in this assembled relation by the fit of the hose in the coupling until the rolling or spinning operation is completed.

It will be apparent to those skilled in the art that the coupling and the method of affixing the coupling to the hose may be varied within certain limits without departing from the spirit and scope of my invention and I therefore do not wish to be limited other than by the claim appended thereto.

I claim:

In a hose coupling having a metallic body portion provided with an integrally connected nipple, radial wall and outer sleeve, and a hose arranged within the annular space defined by said nipple, wall and sleeve, means for securing said coupling on said hose comprising an inwardly extending compression rib formed on the outer sleeve, the construction and arrangement being such that the hose material is forced against said radial wall and the end of the sleeve is flared outwardly for reducing the abrasive effect of the end of the sleeve on the hose material.

ALBERT J. WEATHERHEAD, JR.